(No Model.)

J. L. MILLER.
PLOW.

No. 416,269. Patented Dec. 3, 1889.

Fig. 1
Fig. 2
Fig. 3

Attest
W B Horford
D. O. Bouda

Inventor
Justus L. Miller.
By his atty

United States Patent Office.

JUSTUS L. MILLER, OF PAULDING, OHIO, ASSIGNOR TO THE ST. JOSEPH MANUFACTURING COMPANY, OF MISHAWAKA, INDIANA.

PLOW.

SPECIFICATION forming part of Letters Patent No. 416,269, dated December 3, 1889.

Application filed June 10, 1889. Serial No. 313,779. (No model.)

*To all whom it may concern:*

Be it known that I, JUSTUS L. MILLER, of Paulding, in the county of Paulding and State of Ohio, have invented new and useful Improvements in Plows; and I do hereby declare that the following is a full and accurate description of the same, reference being had to the accompanying drawings, wherein—

Figure 1 is a perspective view of my invention. Fig. 2 shows another form of colter. Fig. 3 shows a modification of the brace.

My improvement relates to plows which are adapted for, and used in, breaking up new land, or land which has become infested with a growth of young shrubs or other strong-rooted plants.

The difficulties experienced in plowing or breaking up ground obstructed with strong roots are so great that a special form of plow has been devised for this particular service, known as "new-ground plows." These plows are provided with short small mold-boards and small landsides, and the line of draft is low, so that when in use the point is depressed. The effect of this is, the attendant has large command over a plow to guide and control it as it passes through, under, or over obstructions, and to assist it in breaking through obstructing roots by the leverage of its handles.

My improvement consists in a colter attached to the plow-beam and provided with an adjusting-brace, whereby its angular position, as to the point of the share, may be adjusted and maintained. The colter passes in advance of the point of the share and severs the sod and roots along the line of advance from the surface down to the level of the plow-sole. But in breaking new land which is infested with roots of shrubs and small trees it is sometimes desirable to adjust the colter at one angle and sometimes at another, according to the size or tenacity of the roots. For instance, when the ground is infested only with grass roots it is desirable to have the colter more nearly vertical than will be allowable when the roots are large and tenacious, because in the latter case it is desirable if the colter cannot sever the root it shall pass over it, riding on the edge of the colter.

Having now indicated the nature and utility of my improvement, I will particularly describe the structure and mode of attachment of it to a new-ground plow of ordinary structure.

A is the plow-beam, and B is the mold-board. Both are of ordinary structure and form. It will be perceived that the mold-board is small and the standard very strong.

C is the colter, having its front or cutting edge convex and curved backward at its lower extremity. The point of the colter is set a little in advance of, and below the point of, the share, so that said share-point will not encounter any root or obstruction which the colter cannot sever, but will be carried over it, riding on the convex edge. The shank of the colter is clamped to the side of the beam A by means of the clip D; but this clip is not capable of holding the colter except in one position. I therefore apply a brace E, which extends from the colter at a point below the beam back to the standard F. It is attached to the colter by a bolt, and at its other end it is provided with a slot or series of holes, whereby its fastening-bolt $g$ may be inserted at one or another point to hold the colter in a position more or less inclined.

To adjust the colter as to inclination, it is necessary to do so by moving the clip, because whatever may be its angular position its lower extremity or point must always occupy the same position in relation to the point of the share. As the clip passes obliquely across the colter, it is obvious it cannot restrain motion in the plane of the cut except in one position of the colter, and that the brace or some substitute must be employed.

Having described my invention, I claim as new—

1. A plow A B and a colter fastened to the beam and adjustable forward or backward thereon, combined with an independent adjustable support extending from said colter to the plow-standard to retain said colter in the desired position.

2. A plow-beam A, mold-board B, a colter C, a fastening for the same movable forward or backward along said beam, and an adjustable supporting-brace E, whereby said colter may be adjusted and maintained at any desired inclination from the point of the plow-share, substantially as set forth.

JUSTUS L. MILLER.

Witnesses:
W. C. DRAPIER,
JOHN NILES.